United States Patent
Skaggs et al.

(10) Patent No.: US 10,146,202 B2
(45) Date of Patent: Dec. 4, 2018

(54) METHOD AND DEVICE FOR PERFORMING AUTOMATED OPERATIONS ON A WORKPIECE

(71) Applicant: The Boeing Company, Huntington Beach, CA (US)

(72) Inventors: Kirk Douglas Skaggs, Kent, WA (US); Lee Dwayne Lepper, Bonney Lake, WA (US)

(73) Assignee: THE BOEING COMPANY, Chicago, IL (US)

( * ) Notice: Subject to any disclaimer, the term of this patent is extended or adjusted under 35 U.S.C. 154(b) by 274 days.

(21) Appl. No.: 14/801,312

(22) Filed: Jul. 16, 2015

(65) Prior Publication Data

US 2017/0017224 A1    Jan. 19, 2017

(51) Int. Cl.
*G05B 19/19* (2006.01)
*G05D 1/02* (2006.01)

(52) U.S. Cl.
CPC .......... *G05B 19/19* (2013.01); *G05D 1/0234* (2013.01); *G05D 1/0261* (2013.01); *G05B 2219/32001* (2013.01); *G05D 2201/0207* (2013.01)

(58) Field of Classification Search
CPC . G05B 19/19; G05B 2219/32001; G05D 1/02
See application file for complete search history.

(56) References Cited

U.S. PATENT DOCUMENTS

| | | | |
|---|---|---|---|
| 4,578,846 A * | 4/1986 | Schott | B21J 15/10 29/243.53 |
| 4,831,232 A | 5/1989 | Andersson et al. | |
| 5,848,458 A | 12/1998 | Bullen | |
| 6,098,260 A * | 8/2000 | Sarh | B21J 15/10 227/52 |
| 6,580,978 B1 | 6/2003 | McTamaney | |
| 2008/0027580 A1 | 1/2008 | Zhang et al. | |
| 2008/0077276 A1* | 3/2008 | Montero Sanjuan | B21J 15/14 700/245 |
| 2009/0118890 A1 | 5/2009 | Lin et al. | |
| 2011/0160949 A1 | 6/2011 | Kondo | |
| 2012/0011693 A1* | 1/2012 | Amirehteshami | B23P 21/002 29/428 |

(Continued)

FOREIGN PATENT DOCUMENTS

WO    2015094052 A1    6/2015

OTHER PUBLICATIONS

Richardson, R., "Integrated Laser and Optical Projection," AeroDef Manufacturing Conference and Exposition, Apr. 20-23, 2015, Dallas, TX (17 pgs).

(Continued)

*Primary Examiner* — Kenneth M Lo
*Assistant Examiner* — Istiaque Ahmed
(74) *Attorney, Agent, or Firm* — Armstrong Teasdale LLP (57) ABSTRACT

A method of performing automated operations on a workpiece by at least one autonomous device is provided. The method includes sensing, by a first of the at least one autonomous devices, a guidance pattern positioned on the workpiece along a first path. The method also includes traversing, by the first autonomous device, along the first path by following the sensed guidance pattern, to a first path location that is within a detection distance of a first precision target indicator positioned on the workpiece.

22 Claims, 4 Drawing Sheets

(56) References Cited

U.S. PATENT DOCUMENTS

2012/0179337 A1* 7/2012 Doan .................. G05D 1/0891
                                                    701/49
2014/0005873 A1* 1/2014 Chen .................. G05D 1/0263
                                                    701/23

OTHER PUBLICATIONS

Kinard, D., "Advanced Manufacturing and the F-35 Lightning II," AeroDef Manufacturing Conference and Exposition, Apr. 20-23, 2015, Dallas, TX (19 pgs).

DuVal, A., "Laser Projection for Legacy Programs," AeroDef Manufacturing Conference and Exposition, Apr. 20-23, 2015, Dallas, TX (9 pgs).

European Search Report for related Application 16178601.7-1802 dated Dec. 6, 2016, 10 pp.

Gruver Wa: "Intelligent Robotics in Manufacturing, Service, and Rehabilitation: An Overview", IEEE Transactions on Industrial Electronics, IEEE Service Center, Piscataway, NJ, USA, vol. 41, No. I, Feb. 28, 1994 (Feb. 28, 1994), pp. 4-11.

\* cited by examiner

METHOD AND DEVICE FOR PERFORMING AUTOMATED OPERATIONS ON A WORKPIECE

BACKGROUND

The field of the disclosure relates generally to the performance of automated operations on a workpiece, and, more particularly, to methods and devices that are autonomously guided along the workpiece to targeted operation sites.

Many structures, such as but not limited to aircraft, are manufactured, inspected, cleaned, repaired, and/or otherwise maintained at least partly using automated processes. At least some such processes, including but not limited to forming fastener openings in a workpiece, coupling fasteners to the workpiece, applying surface coatings to the workpiece, and performing inspections of particular locations on the workpiece, are performed by one or more automated devices. However, in at least some cases, a speed and efficiency of such automated processes are limited to the extent that the automated devices must be guided to the appropriate target sites on the workpiece for each operation.

At least some such processes rely at least partially on facility-based and/or environment-based guidance systems to facilitate positioning the automated devices with respect to the workpiece. However, such guidance systems require establishing and maintaining a known position and orientation of each workpiece relative to the facility, which adds a layer of complexity and expense to the location problem. In addition, at least some such facility-based and/or environment-based guidance systems, such as but not limited to laser coordinate tracking systems, require line-of-sight contact between dedicated facility-based sensors and each automated device during operations, thus limiting a range of the automated devices and limiting a number of automated devices that can be guided simultaneously. Furthermore, installing and maintaining some such facility-based and/or environment-based guidance systems requires a layer of technological complexity in addition to the automated devices themselves. Moreover, an accuracy of at least some such facility-based and/or environment-based guidance systems, including but not limited to GPS-based guidance systems, is not sufficient to position the automated devices with a required precision for certain operations.

BRIEF DESCRIPTION

In one aspect, a method of performing automated operations on a workpiece by at least one autonomous device is provided. The method includes sensing, by a first of the at least one autonomous devices, a guidance pattern positioned on the workpiece along a first path. The method also includes traversing, by the first autonomous device, along the first path by following the sensed guidance pattern, to a first path location that is within a detection distance of a first precision target indicator positioned on the workpiece.

In another aspect, an autonomous device for performing at least one automated operation on a workpiece is provided. The autonomous device includes a sensor system configured to sense a guidance pattern positioned on the workpiece along a first path. The autonomous device also includes a drive system communicatively coupled to the sensor system. The drive system is configured to traverse the first autonomous device along the first path to a first path location that is within a detection distance of a first precision target indicator positioned on the workpiece.

The features, functions, and advantages that have been discussed can be achieved independently in various embodiments or may be combined in yet other embodiments, further details of which can be seen with reference to the following description and drawings.

DETAILED DESCRIPTION

Embodiments of the methods and devices described herein provide for traversal of autonomous devices along a workpiece to within a detection distance of each of a series of precision target indicators, using a guidance pattern positioned on the workpiece and sensed by the autonomous device. The autonomous device then uses the detected precision target indicator to determine a precise target location for performance of an automated operation.

Unless otherwise indicated, "coupled" as used herein encompasses both elements that are associated directly and elements that are associated indirectly. For example, a member A coupled to a member B may be directly associated with a member B, or may be indirectly associated therewith, for example, via another member C. Moreover, unless otherwise indicated, reference to elements that are "coupled" together encompasses both elements that are fastened, adhered, or otherwise secured together, and elements that are coupled, for example by physical contact, in an unsecured fashion. Additionally, unless otherwise indicated, the terms "first," "second," etc. are used herein merely as labels, and are not intended to impose ordinal, positional, or hierarchical requirements on the items to which these terms refer. Reference to, for example, a "second" item does not require or preclude the existence of, for example, a "first" or lower-numbered item or a "third" or higher-numbered item. Additionally, unless otherwise indicated, approximating language, such as "generally" and "substantially," as used herein indicates that the term so modified may apply to only an approximate degree, as would be recognized by one of ordinary skill in the art, rather than to an absolute or perfect degree.

Figure 4:
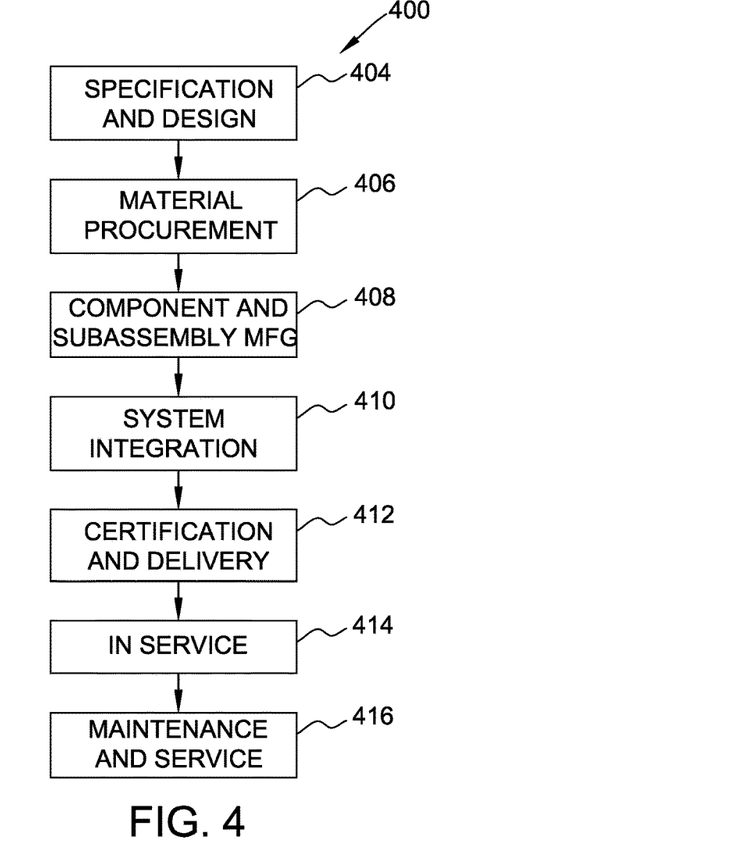
FIG. 4 is a flow diagram of an exemplary aircraft production and service methodology.
Figure 5:
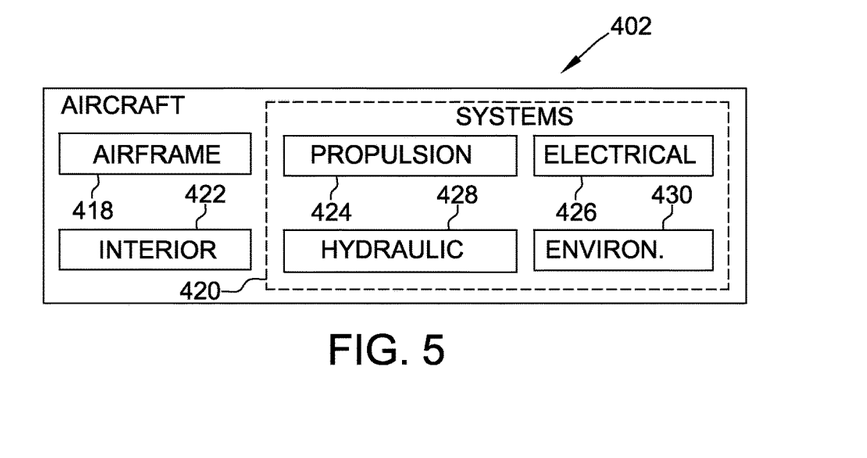
FIG. 5 is a schematic view of an exemplary aircraft.

Referring more particularly to the drawings, embodiments of the disclosure may be described in the context of an exemplary aircraft manufacturing and service method 400 as shown in FIG. 4 and an exemplary aircraft 402 as shown in FIG. 5. It should be understood, however, that although an aerospace example is shown, the principles of the disclosure may be applied to other structures virtually without limitation.

Figure 1:
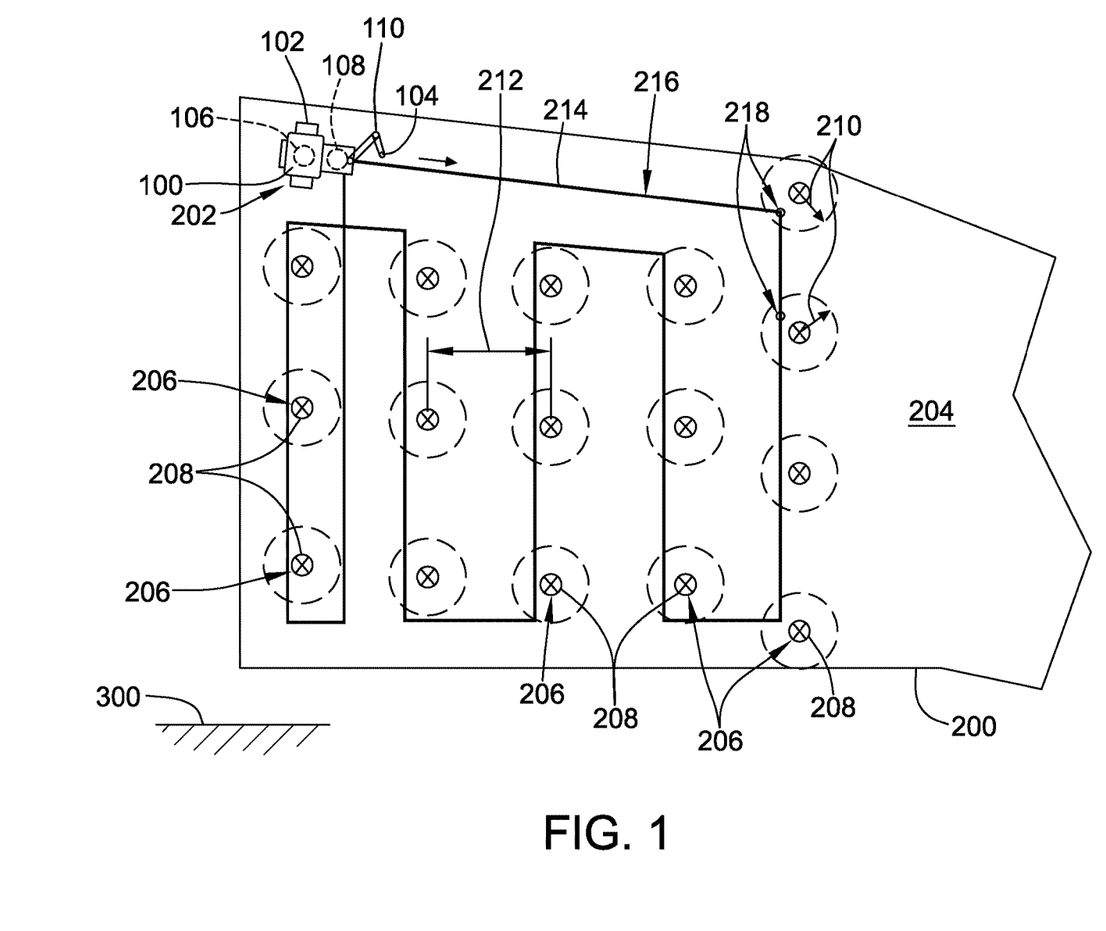
FIG. 1 is a schematic plan view of an exemplary embodiment of an autonomous device, positioned on an exemplary embodiment of a workpiece that may be used with the exemplary aircraft shown in FIG. 5.

FIG. 1 is a schematic plan view of an exemplary embodiment of an autonomous device 100 positioned with respect to an exemplary embodiment of a workpiece 200. For example, but not by way of limitation, workpiece 200 is a component of a wing of aircraft 502. Workpiece 200 is disposed in any suitable fashion in an environment 300, such as but not limited to a manufacturing facility. An autonomous device 100 is illustrated at an initial location 202 on workpiece 200. Autonomous device 100 is initially positionable at initial location 202 in any suitable fashion that enables autonomous device 100 to function as described herein. Autonomous device 100 includes a drive system 102 that is capable of traversing autonomous device 100 along a surface 204 of workpiece 200.

In the illustrated embodiment, autonomous device 100 is substantially supported by workpiece 200. Moreover, in the illustrated embodiment, drive system 102 couples autonomous device 100 directly to surface 204 of workpiece 200. For example, but not by way of limitation, drive system 102 includes wheels or crawler tracks that traverse surface 204, such that autonomous device 100 traverses along workpiece 200. Alternatively, drive system 102 does not couple autonomous device 100 directly to surface 204. In some alternative embodiments, autonomous device 100 is substantially supported by, for example, a floor or ceiling of environment 300, and drive system 102 is coupled between autonomous device 100 and environment 300. For example, but not by way of limitation, autonomous device 100 is suspended from a track system (not shown) mounted in environment 300, and drive system 102 is configured to position autonomous device 100 on the track system to traverse autonomous device 100 along workpiece 200. For another example, but not by way of limitation, autonomous device 100 is coupled to a robotic arm (not shown) mounted in environment 300, and drive system 102 is configured to position the robotic arm to traverse autonomous device 100 along workpiece 200. In other alternative embodiments, drive system 102 is any other suitable drive system that enables autonomous device 100 to traverse along workpiece 200 as described herein.

Autonomous device 100 is configured to perform at least one automated operation on workpiece 200, such as, but not limited to, any suitable manufacturing, repair, inspection, and/or cleaning operation. For example, but not by way of limitation, autonomous device 100 includes an end effector 104 that is configured to at least one of spray a coating on workpiece 200, form an opening in workpiece 200, insert a fastener into an opening in workpiece 200, and swage a head of a fastener coupled to workpiece 200.

Workpiece 200 includes a plurality of pre-selected target locations 206 at which the at least one operation is to be performed by autonomous device 100. To facilitate identification of target locations 206 by autonomous device 100, a plurality of precision target indicators 208 are positioned on workpiece 200. Each precision target indicator 208 is configured to be physically detectable by a suitable automated system. Moreover, each precision target indicator 208 is associated with a corresponding target location 206. In the illustrated embodiment, for example, each precision target indicator 208 is co-located with a corresponding target location 206. In alternative embodiments (not shown), each precision target indicator 208 is located on workpiece 200 at a predetermined offset from a corresponding target location 206. For example, but not by way of limitation, in certain embodiments, autonomous device 100 is configured to drill an opening in workpiece 200 at each target location 206, and each precision target indicator 208 is co-located with a corresponding target location 206. For another example, but not by way of limitation, in certain embodiments, autonomous device 100 is configured to spray a coating on a portion of surface 204 between a first target location 206 and a second target location 206, and an associated precision target indicator 208 is positioned at each target location 206 to identify a precise starting and ending location for the spraying operation.

In certain embodiments, precision target indicators 208 are positioned on workpiece 200 by coupling precision target indicators 208 to workpiece 200 in a fashion that facilitates easy removal of precision target indicators 208 from workpiece 200 after manufacturing, repair, inspection, and/or cleaning operations guided by precision target indicators 208 are complete. In some embodiments, an operation performed by autonomous device 100 at target location 206 removes the associated precision target indicator 208. In other embodiments, precision target indicators 208 are configured to remain positioned on workpiece 200 after such operations are complete, for example, but not by way of limitation, to facilitate future manufacturing, repair, inspection, and/or cleaning operations.

Autonomous device 100 includes a detector system 106 configured to detect precision target indicators 208. A type and sensitivity of detector system 106 is selected based on a type of precision target indicators 208. For example, but not by way of limitation, each precision target indicator 208 is a physical alteration in surface 204, such as a precision tack drill opening, and detector system 106 is configured to optically detect a shape and size of the physical alteration. For another example, but not by way of limitation, each precision target indicator 208 is a magnetic fastener opening centerline field locator, and detector system 106 is configured to magnetically detect a strength of the magnetic field generated.

A detection distance 210 is defined for each precision target indicator 208 as a distance at which detector system 106 can reliably detect precision target indicator 208. Detection distance 210 is determined by the type and sensitivity of detector system 106 and the type of precision target indicators 208. A region in which autonomous device 100 can reliably detect each precision target indicator 208 is illustrated in FIG. 1 by a corresponding dashed circle with a radius equal to detection distance 210. It should be understood that the detection region also extends hemispherically above surface 204 with radius equal to detection distance 210. In certain embodiments, to facilitate a reduction or elimination of interference in the detection of each precision target indicator 208, the type and sensitivity of detector system 106 and the type of precision target indicators 208 are selected such that the hemispheres do not overlap, that is, such that a separation distance 212 between any two precision target indicators 208 is greater than twice detection distance 210.

To facilitate traversal of autonomous device 100 along workpiece 200 to within detection distance 210 of each precision target indicator 208, a guidance pattern 214 is positioned on workpiece 200 along a first path 216. Guidance pattern 214 is configured to be physically detected by a suitable automated system. In the illustrated embodiment, for example, first path 216 passes within detection distance 210 of each of plurality of precision target indicators 208 positioned on surface 204. In alternative embodiments, as will be described herein, guidance pattern 214 is positioned on workpiece 200 in multiple paths that each pass within detection distance 210 of selected precision target indicators 208 positioned on surface 204.

In certain embodiments, guidance pattern 214 is positioned on workpiece 200 by coupling a tangible material to workpiece 200. Coupling guidance pattern 214 embodied as a tangible material to workpiece 200 facilitates traversal of autonomous device 100 along workpiece 200 to within detection distance 210 of each precision target indicator 208 without relying on facility-based and/or environment-based guidance systems. In some embodiments, guidance pattern 214 embodied as a tangible material is coupled to workpiece 200 in a fashion that facilitates easy removal from workpiece 200 after manufacturing, repair, inspection, cleaning, and/or other operations guided by first path 216 are complete. In some such embodiments, autonomous device 100 is configured to remove guidance pattern 214 as autonomous device 100 traverses along first path 216. For example, but not by way of limitation, guidance pattern 214 is applied to workpiece 200 by at least one of an automated inkjet device, an automated tape dispensing device, a hand application of ink, a hand application of tape, and any other suitable method. In alternative embodiments, guidance pattern 214 is configured to remain positioned on workpiece 200 after such manufacturing, repair, inspection, cleaning, and/or other operations are complete, for example, but not by way of limitation, to facilitate future manufacturing, repair, inspection, cleaning, and/or other operations.

Additionally or alternatively, in some embodiments, guidance pattern 214 is positioned on workpiece 200 by projecting electromagnetic radiation, such as but not limited to visible light, onto surface 204 of workpiece 200. Projecting guidance pattern 214 embodied as electromagnetic radiation onto workpiece 200 facilitates traversal of autonomous device 100 along workpiece 200 to within detection distance 210 of each precision target indicator 208, without introducing additional physical material to surface 204 that may later need to be removed and/or cleaned. For example, but not by way of limitation, guidance pattern 214 is applied to workpiece 200 by a suitable visible light projection system stationed in environment 300 and suitably aligned with workpiece 200. For another example, but not by way of limitation, guidance pattern 214 is applied to workpiece 200 by a suitable ultraviolet projection system stationed in environment 300 and suitably aligned with workpiece 200. For another example, but not by way of limitation, guidance pattern 214 is applied to workpiece 200 by a suitable infrared projection system stationed in environment 300 and suitably aligned with workpiece 200.

Notably, a position of first path 216 is not required to be as precise as, for example, a position of each precision target indicator 208. First path 216 need only pass through any point within detection distance 210 of each precision target indicator 208 at which autonomous device 100 is intended to perform an operation. Thus, an accuracy requirement for an application of guidance pattern 214 is correspondingly low, facilitating a relatively fast and inexpensive use of guidance pattern 214, as compared to the use of known guidance systems to guide autonomous device 100 within range of each precision target indicator 208.

Moreover, although not visible in the plan view of FIG. 1, in the illustrated embodiment, surface 204 is a contoured surface, such that at least a portion of first path 216 is positioned over a contoured surface of workpiece 200. Drive system 102 is configured to traverse first path 216 over contoured surface 204, without the line-of-sight issues that could arise in using at least some facility-based and/or environment-based guidance systems to guide autonomous device 100 over contoured surfaces.

Autonomous device 100 includes a sensor system 108 configured to sense guidance pattern 214 along first path 216. A type and sensitivity of sensor system 108 is selected based on a type of guidance pattern 214. For example, but not by way of limitation, guidance pattern 214 is one of a magnetic adhesive tape and a magnetic ink, and sensor system 108 is configured to magnetically sense a strength of the magnetic field generated. For another example, but not by way of limitation, guidance pattern 214 is one of an adhesive tape and an ink that presents a detectable optical contrast with surface 204, and sensor system 108 is configured to optically sense the contrast along surface 204. For another example, but not by way of limitation, guidance pattern 214 is one of a conductive adhesive tape and a conductive ink, and sensor system 108 is configured to electrically sense a strength of the electric field generated. For another example, but not by way of limitation, guidance pattern 214 is projected onto workpiece 200 using visible light, and sensor system 108 is configured to sense the visible light arriving from above surface 204. For another example, but not by way of limitation, guidance pattern 214 is projected onto workpiece 200 using ultraviolet electromagnetic radiation, and sensor system 108 is configured to sense the ultraviolet electromagnetic radiation arriving from above surface 204. For another example, but not by way of limitation, guidance pattern 214 is projected onto workpiece 200 using infrared electromagnetic radiation, and sensor system 108 is configured to sense the infrared electromagnetic radiation arriving from above surface 204.

In certain embodiments, guidance pattern 214 and sensor system 108 are selected to avoid a potential interference with precision target indicators 208 and detector system 106. For example, but not by way of limitation, in some embodiments in which each precision target indicator 208 is a magnetic fastener opening centerline field locator and detector system 106 is configured to magnetically detect a strength of the magnetic field generated, guidance pattern 214 is selected to be other than a magnetic material to avoid interference with detector system 106.

However, it should be understood that guidance pattern 214 and sensor system 108, on the one hand, and precision target indicators 208 and detector system 106, on the other hand, can be selected to reduce or eliminate potential interference even if each system operates on the same detection principle. For example, but not by way of limitation, guidance pattern 214 is selected to be a magnetic ink that generates a relatively weak magnetic field, and sensor system 108 is tuned to detect a magnetic field only at very close proximity. Sensor system 108 is positioned on autonomous device 100 such that sensor system 108 is positioned in close proximity to surface 204 when autonomous device 100 traverses along workpiece 200, such that sensor system 108 is in position to sense guidance pattern 214 on surface 204. In contrast, precision target indicators 208 are selected to generate a relatively strong magnetic field, and detector system 106 is tuned to detect only a relatively high magnetic field strength within detection distance 210. In alternative embodiments, each of detector system 106 and sensor system 108 is configured in any suitable fashion that enables autonomous device 100 to function as described herein.

Drive system 102 is communicatively coupled to sensor system 108. More specifically, drive system 102 is configured to traverse autonomous device 100 along first path 216 using data received from sensor system 108. In addition, autonomous device 100 is configured to detect each precision target indicator 208, using data received from detector system 106, when autonomous device 100 traverses to within detection distance 210 of target indicator 208. A path location 218 is identified as the location of autonomous device 100 when detector system 106 detects a corresponding precision target indicator 208. It should be understood that path location 218 is not necessarily located precisely at detection distance 210 from the detected precision target indicator 208. For example, but not by way of limitation, in certain embodiments, detector system 106 takes data samples at discrete intervals, such that autonomous device 100 has traversed closer than detection distance 210 before detector system 106 detects precision target indicator 208. For another example, but not by way of limitation, in some embodiments, detector system 106 is configured to detect precision target indicator 208 throughout a predetermined persistence interval before notifying autonomous device 100 of the detection, in order to reduce or eliminate false detections of precision target indicator 208.

Autonomous device 100 is configured to perform at least one automated operation on workpiece 200, such as any suitable manufacturing, repair, inspection, cleaning, and/or other operation as described above, at target location 206 associated with the detected precision target indicator 208. In certain embodiments, autonomous device 100 includes a servo system 110 operatively coupled to end effector 104 and communicatively coupled to detector system 106. Servo system 110 is configured to use data received from detector system 106 to position end effector 104 at target location 206 associated with the detected precision target indicator 208. For example, but not by way of limitation, autonomous device 100 is configured to stop at path location 218 to enable servo system 110 to position end effector 104 at target location 206. After end effector 104 is suitably positioned, autonomous device 100 performs the at least one automated operation on workpiece 200, as described above.

In alternative embodiments, autonomous device 100 does not stop its traversal along first path 216 prior to performing the at least one operation. For example, but not by way of limitation, after detector system 106 detects precision target indicator 208 at path location 218, autonomous device 100 initiates one of a spraying operation and an inspection operation at target location 206 as autonomous device 100 continues to traverse workpiece 200 along first path 216.

In some embodiments, autonomous device 100 is further configured to traverse along first path 216 beyond a first path location 218 to a second path location 218 that is within detection distance 210 of a second precision target indicator 208. More specifically, autonomous device 100 traverses along first path 216 beyond the first path location 218 using data received from sensor system 108. Autonomous device 100 is configured to detect the second precision target indicator 208, using data received from detector system 106, when autonomous device 100 traverses to within detection distance 210 of the second target indicator 208, as described above. Also as described above, the second path location 218 is identified as the location of autonomous device 100 when detector system 106 detects the corresponding second precision target indicator 208.

For example, but not by way of limitation, in embodiments in which autonomous device 100 stops at the first path location 218, autonomous device 100 is configured to resume traversing along first path 216 after the at least one operation at the first target location 206 is complete. In some such embodiments, upon reaching the second path location 218, autonomous device 100 is configured to stop and perform the at least one operation at a second target location 206 associated with the second precision target indicator 208. For another example, but not by way of limitation, in embodiments in which autonomous device 100 does not stop its traversal along first path 216 prior to performing the at least one operation, autonomous device 100 continues traversing along first path 216 as the at least one operation initiated at the first target location 206 continues. In some such embodiments, autonomous device 100 is configured to stop the at least one operation upon reaching the second path location 218.

In certain embodiments, autonomous device 100 is configured to continue traversing along first path 216 and sequentially detecting each precision target indicator 208 in the same manner as described above. In the illustrated embodiment, guidance pattern 214 is positioned on workpiece 200 such that first path 216 is a closed path, that is, such that first path 216 returns autonomous device 100 to initial location 202. For example, but not by way of limitation, suitable equipment for initially positioning autonomous device 100 on, and removing autonomous device 100 from, workpiece 200 is located in environment 300 adjacent initial location 202. In alternative embodiments, guidance pattern 214 is positioned on workpiece 200 such that first path 216 is an open path, that is, such that first path 216 does not return autonomous device 100 to initial location 202.

Although autonomous device 100 has been described as performing the at least one operation during each traversal of first path 216, it should be understood that, in some embodiments, autonomous device 100 is configured to traverse along first path 216 at least once without performing the at least one operation. For example, but not by way of limitation, autonomous device 100 is configured to traverse along first path 216 at least a first time, without performing the at least one operation, to identify and store the location of each precision target indicator 208. Autonomous device 100 is further configured to traverse first path 216 at least a second time to perform the at least one operation at target locations 206 associated with the identified precision target indicators 208.

Figure 2:
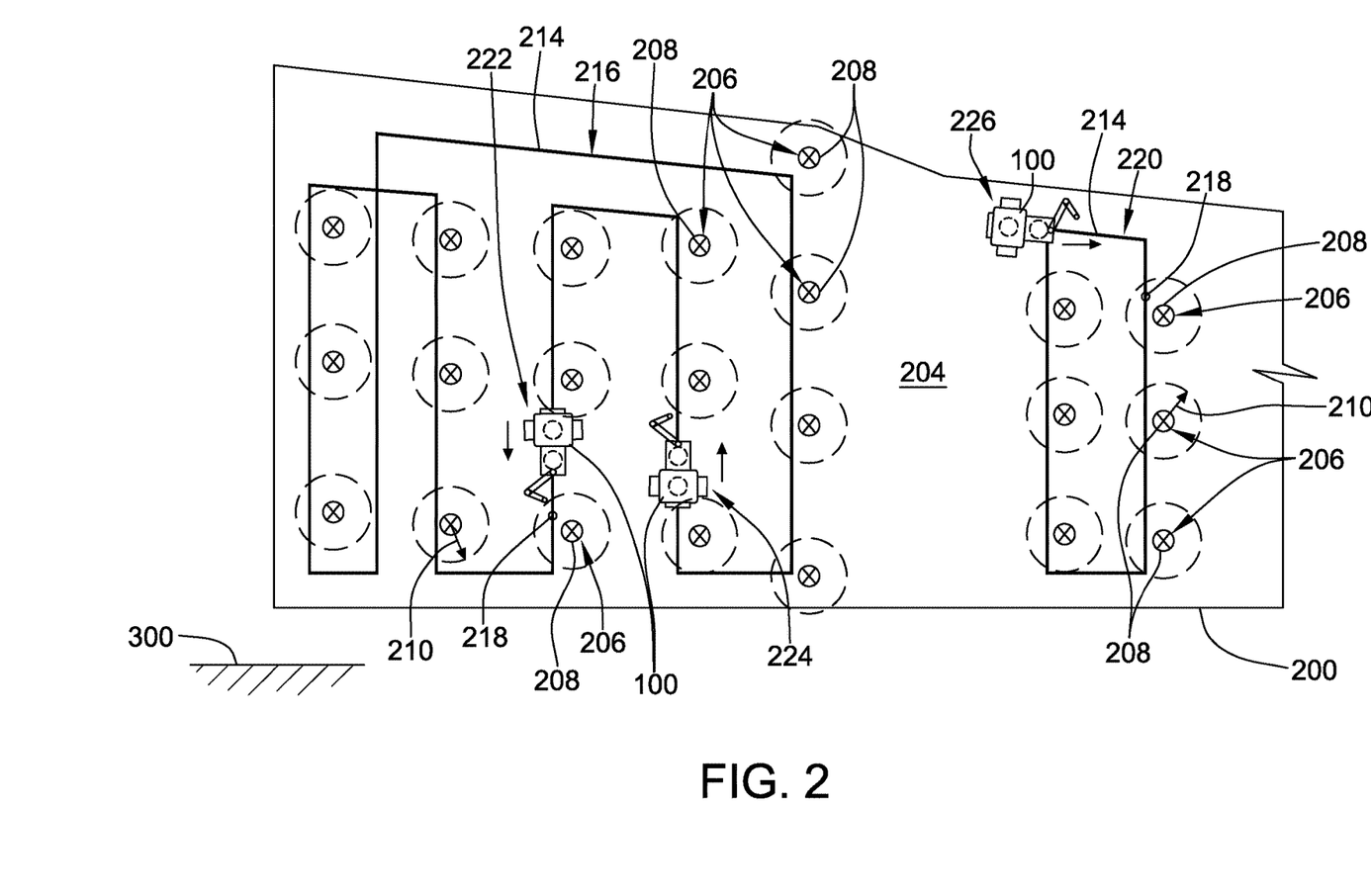
FIG. 2 is a schematic plan view of a plurality of the exemplary autonomous devices shown in FIG. 1, positioned on another exemplary embodiment of a workpiece that may be used with the exemplary aircraft shown in FIG. 5.

FIG. 2 is a schematic plan view of a plurality of autonomous devices 100 positioned on another exemplary embodiment of workpiece 200. For example, workpiece 200 is a component of a wing of aircraft 502. In the illustrated embodiment, guidance pattern 214 is positioned on workpiece 200 along a first path 216 and along a separate second path 220. For purposes of illustration, a first autonomous device 100 is illustrated at a first location 222 on workpiece 200 along first path 216, a second autonomous device 100 is located at a second location 224 on workpiece 200 along first path 216, and a third autonomous device 100 is located at a third location 226 on workpiece 200 along second path 220.

In certain embodiments, the first autonomous device 100 traverses along first path 216 by following the sensed guidance pattern 214, and the second autonomous device 100 also traverses along first path 216, behind the first autonomous device 100, by following the sensed guidance pattern 214. For example, the second autonomous device 100 detects each precision target indicator 208 at approximately the same path location 218 at which the first autonomous device detected the precision target indicator 208. In some embodiments, after the first autonomous device 100 performs a first operation at a first target location 206 associated with a first precision target indicator 208, as described above, the second autonomous device 100 performs a second operation at the first target location 206 associated with the first precision target indicator 208. For example, but not by way of limitation, the first autonomous device 100 forms an opening at the first target location 206, and the second autonomous device 100 inserts a fastener into the opening. For another example, but not by way of limitation, the first autonomous device 100 inserts a fastener into an opening at the first target location 206, and the second autonomous device 100 swages a head of the fastener. In some such embodiments, the first operation results in a removal of an initial first precision target indicator 208, but also creates a replacement first precision target indicator 208, such as but not limited to an optically detectable feature on surface 204, for detection by the second autonomous device 100. In some embodiments, each autonomous device 100 is suitably configured to detect a proximity of and/or avoid interference with other autonomous devices 100 as autonomous devices 100 cooperate to perform the operations.

In some embodiments, any suitable number of autonomous devices 100 simultaneously and/or successively traverses first path 216, and each autonomous device 100 performs at least one automated operation at selected target locations 206, as described above. In comparison to at least some known facility-based and/or environment-based guidance systems used to guide autonomous devices 100 within range of each precision target indicator 208, a relatively large number of autonomous devices 100 can simultaneously be guided along first path 216 by following the sensed guidance pattern 214. As a result, guidance pattern 214 positioned along first path 216 and sensor system 108 of autonomous device 100 facilitate decreasing a time required to perform a series of operations on workpiece 200.

In certain embodiments, the first autonomous device 100 traverses along first path 216 by following the sensed guidance pattern 214, and the third autonomous device 100 simultaneously traverses along second path 216 by following the sensed guidance pattern 214. For example, third autonomous device 100 traverses along second path 220 to a third path location 218 that is within detection distance 210 of a third precision target indicator 208. Moreover, as the first autonomous device 100 performs a first operation at a series of first target locations 206 each associated with a respective precision target indicator 208 along first path 216, as described above, the third autonomous device 100 performs the first operation at a second series of target locations 206 each associated with a respective precision target indicator 208 along second path 220. Because first path 216 and second path 220 are separate, that is, the paths do not cross or overlap, a risk of interference between first autonomous device 100 and third autonomous device 100 is reduced or eliminated.

In contrast to at least some known facility-based and/or environment-based guidance systems used to guide autonomous device 100 within range of each precision target indicator 208, there is no limit, other than a number of paths that can be fit onto workpiece 200, to a number of autonomous devices 100 that can simultaneously traverse separate paths on workpiece 200, such as first path 216 and second path 220, by following the sensed guidance pattern 214. As a result, guidance pattern 214 positioned along first path 216 and second path 220, and sensor system 108 of autonomous device 100, facilitate decreasing a time required to perform an operation at every target location 206 on workpiece 200.

Figure 3:
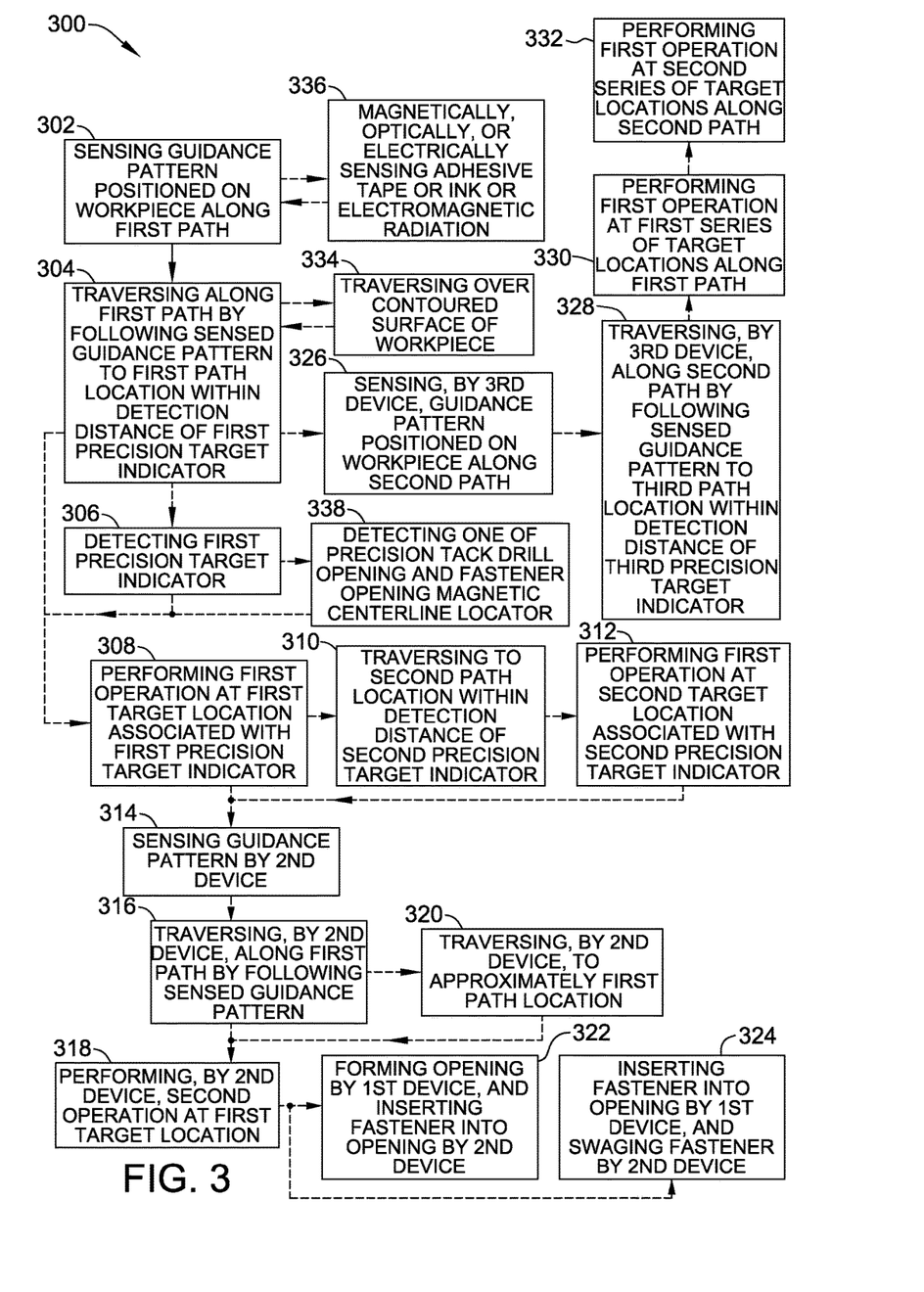
FIG. 3 is a flow diagram of an exemplary embodiment of a method of performing automated operations on a workpiece, such as the workpieces shown in FIGS. 1 and 2, by at least one autonomous device, such as the autonomous device shown in FIGS. 1 and 2.

FIG. 3 is a flow diagram of an exemplary embodiment of a method 301 of performing automated operations on a workpiece, such as workpiece 200, by at least one autonomous device, such as autonomous device 100. With reference to FIGS. 1-3, in the exemplary embodiment, method 301 includes sensing 302, by a first of the at least one autonomous devices, a guidance pattern, such as guidance pattern 214, positioned on the workpiece along a first path, such as first path 214. Method 301 also includes traversing 304, by the first autonomous device, along the first path by following the sensed guidance pattern, to a first path location, such as path location 218, that is within a detection distance of a first precision target indicator positioned on the workpiece, such as within detection distance 210 of precision target indicator 208.

In some embodiments, method 301 further includes detecting 306, by the first autonomous device, the first precision target indicator. In some such embodiments, method 301 more specifically includes detecting 338 one of a precision tack drill opening and a fastener opening magnetic centerline locator.

In certain embodiments, method 301 also includes performing 308, by the first autonomous device, a first operation at a first target location on the workpiece, such as target location 206, associated with the first precision target indicator. In some such embodiments, method 301 further includes traversing 310 beyond the first path location to a second path location, such as a second path location 218, that is within the detection distance of a second precision target indicator positioned on the workpiece. Moreover, in some such embodiments, method 301 includes performing 312, by the first autonomous device, the first operation at a second target location on the workpiece associated with the second precision target indicator. Additionally or alternatively, method 301 includes sensing 314, by a second of the at least one autonomous devices, the guidance pattern, traversing 316, by the second autonomous device, along the first path by following the sensed guidance pattern, and, subsequent to performing the first operation, performing 318, by the second autonomous device, a second operation at the first target location. In some such embodiments, method 301 also includes traversing 320, by the second autonomous device, along the first path to approximately the first path location.

In some embodiments, the steps of performing 308 the first operation and performing 318 the second operation include the step 322 of, respectively, forming an opening and inserting a fastener into the opening. In other embodiments, the steps of performing 308 the first operation and performing 318 the second operation include the step 324 of, respectively, inserting a fastener into an opening at the first target location and swaging a head of the fastener.

In certain embodiments, method 301 includes sensing 326, by a third of the at least one autonomous devices, the guidance pattern positioned on the workpiece along a second path, such as second path 220, and, simultaneously with step 304 of traversing along the first path by the first autonomous device, traversing 328, by the third autonomous device, along the second path by following the sensed guidance pattern to a third path location, such as a third path location 218, that is within the detection distance of a third precision target indicator positioned on the workpiece. In some such embodiments, method 301 further includes performing 330, by the first autonomous device, a first operation at a first series of target locations each associated with a respective precision target indicator along the first path, and simultaneously performing 332, by the third autonomous device, the first operation at a second series of target locations each associated with a respective precision target indicator along the second path.

In some embodiments, the step of traversing 304 along the first path includes traversing 334 at least a portion of the first path over a contoured surface, such as a contoured surface 204, of the workpiece. In certain embodiments, the step of sensing 302 the guidance pattern includes a step 336 of at least one of magnetically sensing a magnetic adhesive tape, magnetically sensing a magnetic ink, optically sensing an adhesive tape, optically sensing an ink, electrically sensing a conductive adhesive tape, electrically sensing a conductive ink, and sensing projected electromagnetic radiation.

Referring to the exemplary aircraft manufacturing and service method 400 as shown in FIG. 4 and the exemplary aircraft 402 as shown in FIG. 5, during pre-production, exemplary method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 402 produced by exemplary method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Apparatus and methods embodied herein may be employed during any one or more of the stages of the production and service method 400, and particularly during at least one of component and subassembly manufacturing 408, system integration 410, in service 414, and routine maintenance and service 416 for airframe 418, for example. For example, one or more system embodiments, method embodiments, or a combination thereof may be utilized during the production stages 408 and 410, for example, in the fabrication and manufacture of components or subassemblies for airframe 418, thereby substantially expediting assembly of or reducing the cost of an aircraft 402. Similarly, one or more of system embodiments, method embodiments, or a combination thereof may be utilized while the aircraft 402 is in service 414, for example and without limitation, as part of maintenance and service 416. For example, replacement or repair of components or subassemblies of airframe 418 may be fabricated or manufactured in a manner similar to production process 408. For example, but not by way of limitation, the systems and methods provide for rapid, low-cost replacement or repair of a component of airframe 418.

The embodiments described herein provide improvements over at least some known methods and devices for performing automated operations on a workpiece. The embodiments described herein provide for traversal of autonomous devices along the workpiece to within a detection distance of each of a series of precision target indicators by following a sensed guidance pattern positioned on the workpiece. An accuracy requirement for positioning of the guidance pattern is relatively low, facilitating a relatively fast and inexpensive use of the guidance pattern as compared to the use of known guidance systems. In addition, use of the guidance pattern avoids other limitations with at least some known guidance systems, such as line-of-sight problems and limitations on the number of autonomous devices that can be guided and operated simultaneously. In some embodiments, the guidance pattern enables such traversal without relying on facility-based and/or environment-based guidance systems such as a GPS system or a laser guidance system. The embodiments described herein also facilitate reducing or eliminating a layer of technological complexity in the facility in which the operations occur.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of performing automated operations on a workpiece by at least one autonomous device supported on the workpiece, said method comprising:
    sensing, by a sensor system of a first of the at least one autonomous devices, a guidance pattern positioned on the workpiece along a first path;
    traversing, by the first autonomous device, along the first path in response to data regarding the sensed guidance pattern received from the sensor system and without relying on facility-based guidance systems, to a first path location that is within a detection distance of a first precision target indicator of a plurality of precision target indicators positioned on the workpiece;
    performing, by the first autonomous device, a first operation at a first target location on the workpiece associated with the first precision target indicator; and
    traversing, by the first autonomous device after performing the first operation, along the first path in response to data regarding the sensed guidance pattern received from the sensor system and without relying on facility-based guidance systems, to a second path location that is within the detection distance of a second precision target indicator of the plurality of precision target indicators, wherein the second precision target indicator is spaced from the first precision target indicator by a distance greater than twice the detection distance.

2. The method of claim 1, further comprising electromagnetically detecting, by the first autonomous device, the first precision target indicator.

3. The method of claim 2, wherein said electromagnetically detecting the first precision target indicator comprises one of optically detecting a precision tack drill opening and magnetically detecting a fastener opening magnetic centerline locator.

4. The method of claim 1, further comprising performing, by the first autonomous device, the first operation at a second target location on the workpiece associated with the second precision target indicator.

5. The method of claim 1, further comprising:
    sensing, by a second of the at least one autonomous devices, the guidance pattern;

traversing, by the second autonomous device, along the first path by following the sensed guidance pattern; and subsequent to said performing the first operation, performing, by the second autonomous device, a second operation at the first target location.

6. The method of claim 5, wherein said traversing, by the second autonomous device, along the first path comprises traversing to approximately the first path location.

7. The method of claim 5, wherein said performing the first operation comprises forming an opening, and said performing the second operation comprises inserting a fastener into the opening.

8. The method of claim 5, wherein said performing the first operation comprises inserting a fastener into an opening at the first target location, and said performing the second operation comprises swaging a head of the fastener.

9. The method of claim 1, further comprising:
sensing, by a third of the at least one autonomous devices, the guidance pattern positioned on the workpiece along a second path; and
simultaneously with said traversing along the first path by the first autonomous device, traversing, by the third autonomous device, along the second path by following the sensed guidance pattern, to a third path location that is within the detection distance of a third precision target indicator positioned on the workpiece.

10. The method of claim 9, further comprising:
performing, by the first autonomous device, a first operation at a first series of target locations each associated with a respective precision target indicator along the first path; and
simultaneously performing, by the third autonomous device, the first operation at a second series of target locations each associated with a respective precision target indicator along the second path.

11. The method of claim 1, wherein said traversing along the first path further comprises traversing at least a portion of the first path over a contoured surface of the workpiece.

12. The method of claim 1, wherein said sensing the guidance pattern comprises at least one of magnetically sensing a magnetic adhesive tape, magnetically sensing a magnetic ink, optically sensing an adhesive tape, optically sensing an ink, electrically sensing a conductive adhesive tape, and electrically sensing a conductive ink.

13. An autonomous device for performing at least one automated operation on a workpiece, said autonomous device comprising:
a sensor system configured to sense a guidance pattern positioned on the workpiece along a first path;
a drive system communicatively coupled to said sensor system, said drive system configured to:
traverse said first autonomous device supported on the workpiece along the first path in response to data regarding the sensed guidance pattern received from said sensor system, and without relying on facility-based guidance systems, to a first path location that is within a detection distance of a first precision target indicator of a plurality of precision target indicators positioned on the workpiece; and
traverse, after performing the first operation, said first autonomous device supported on the workpiece along the first path in response to data regarding the sensed guidance pattern received from the sensor system and without relying on facility-based guidance systems, to a second path location that is within the detection distance of a second precision target indicator of the plurality of precision target indicators, wherein the second precision target indicator is spaced from the first precision target indicator by a distance greater than twice the detection distance; and
an end effector configured to perform a first operation at a first target location on the workpiece associated with the first precision target indicator.

14. The autonomous device of claim 13, further comprising a detector system configured to electromagnetically detect the first precision target indicator when said first autonomous device traverses to the first path location.

15. The autonomous device of claim 14, wherein said detector system is configured to at least one of optically detect a precision tack drill opening and magnetically detect a fastener opening magnetic centerline locator.

16. The autonomous device of claim 14, further comprising a servo system communicatively coupled to said detector system, said servo system configured to position an end effector of said first autonomous device at a first target location on the workpiece associated with the first precision target indicator using data received from said detector system.

17. The autonomous device of claim 13, wherein said first autonomous device is configured to perform the first operation at a second target location on the workpiece associated with the second precision target indicator.

18. The autonomous device of claim 13, wherein said first autonomous device is configured to at least one of spray a coating, form an opening, insert a fastener into an opening, and swage a head of a fastener.

19. The autonomous device of claim 13, wherein said autonomous device is further configured to traverse at least a portion of the first path over a contoured surface of the workpiece.

20. The autonomous device of claim 13, wherein said sensor system is configured to at least one of magnetically sense a magnetic adhesive tape, magnetically sense a magnetic ink, optically sense an adhesive tape, optically sense an ink, electrically sense a conductive adhesive tape, electrically sense a conductive ink, and sense projected electromagnetic radiation.

21. The method of claim 1, further comprising forming the guidance pattern by at least one of applying a magnetic adhesive tape to the workpiece, applying a magnetic ink to the workpiece, applying to the workpiece an adhesive tape that presents a detectable optical contrast with a surface of the workpiece, applying to the workpiece an ink that presents a detectable optical contrast with the surface of the workpiece, applying a conductive adhesive tape to the workpiece, and applying a conductive ink to the workpiece.

22. A method of performing automated operations on a workpiece by at least one autonomous device supported on the workpiece, said method comprising:
sensing, by a sensor system of a first of the at least one autonomous devices, a guidance pattern positioned on the workpiece along a first path, the guidance pattern formed from electromagnetic radiation projected onto a surface of the workpiece;
traversing, by the first autonomous device, along the first path in response to data regarding the sensed guidance pattern received from the sensor system, to a first path location that is within a detection distance of a first precision target indicator of a plurality of precision target indicators positioned on the workpiece;
performing, by the first autonomous device, a first operation at a first target location on the workpiece associated with the first precision target indicator; and traversing, by the first autonomous device after performing the first operation, along the first path in response to data regarding the sensed guidance pattern received from the sensor system, to a second path location that is within the detection distance of a second precision target indicator of the plurality of precision target indicators, wherein the second precision target indicator is spaced from the first precision target indicator by a distance greater than twice the detection distance.

\* \* \* \* \*